W. D. MITCHELL.
MACHINE FOR TURNING RINGS FROM TUBES.
APPLICATION FILED APR. 1, 1908.
938,013.
Patented Oct. 26, 1909.
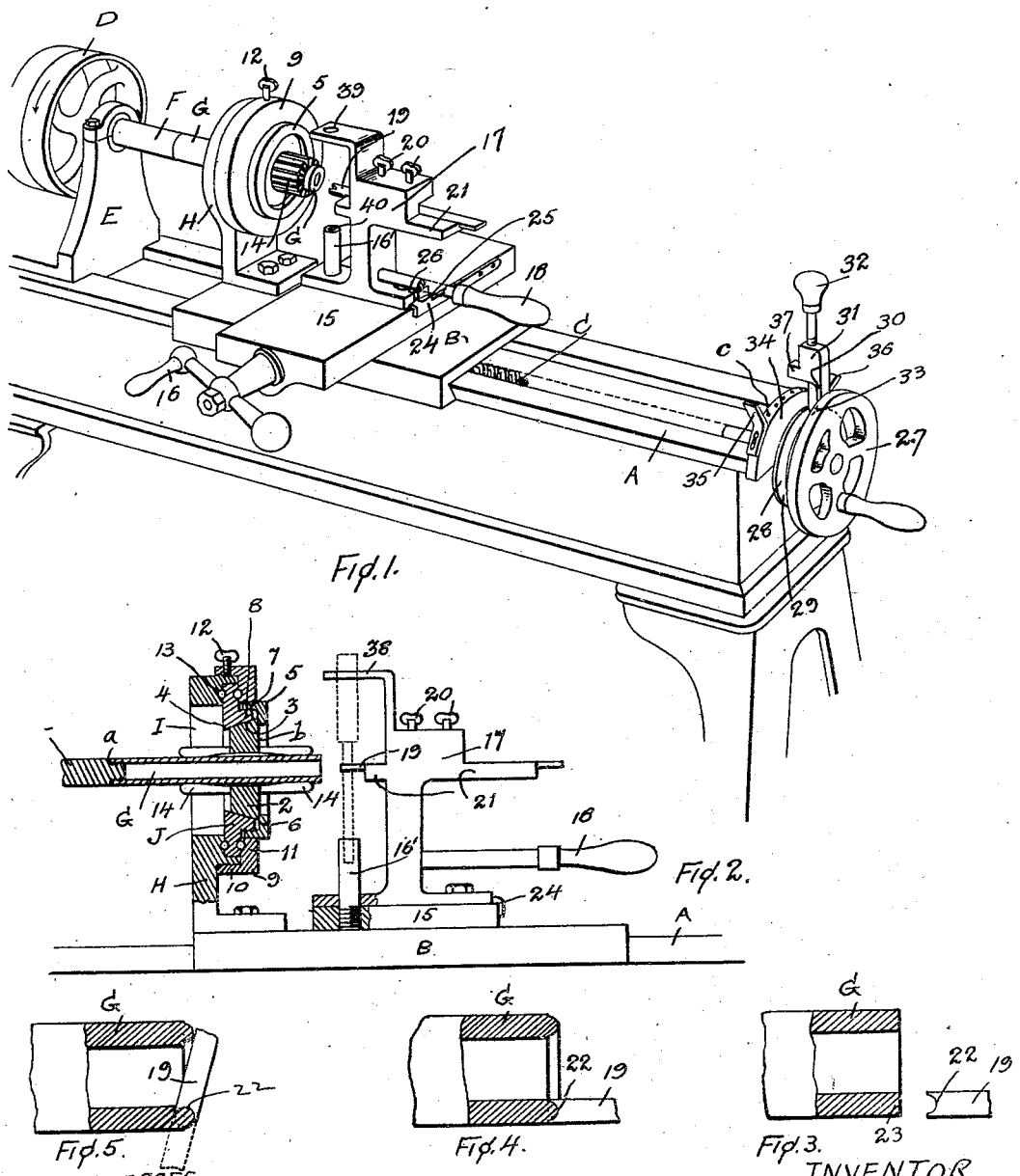

UNITED STATES PATENT OFFICE.

WILLIAM DONALD MITCHELL, OF TORONTO, ONTARIO, CANADA.

MACHINE FOR TURNING RINGS FROM TUBES.

938,013. Specification of Letters Patent. Patented Oct. 26, 1909.

Application filed April 1, 1908. Serial No. 424,572.

*To all whom it may concern:*

Be it known that I, WILLIAM DONALD MITCHELL, a subject of the King of Great Britain, residing in the city of Toronto, county of York, Province of Ontario, Canada, have invented certain new and useful Improvements in Machines for Turning Rings from Tubes, of which the following is a specification.

My invention relates to improvements in machines for turning rings from tubes, whether the tubes be of metallic or non-metallic substance; but I have particularly designed the species of my invention shown, and hereinafter particularly described, in order to reduce the cost of manufacturing celluloid rings.

Another object of my invention is to construct my machine so as to quickly and accurately adjust or position the cutters used to cut rings of different thicknesses; and a still further object of my invention is to design my machine so that the cutter may be quickly thrown into action.

The construction and operation of my preferred form of invention will be hereinafter particularly described, and the parts I claim as new will be pointed out in the claims forming part of this specification.

Figure 1 is a perspective view of my preferred form of invention. Fig. 2 is, in part, a side elevation of the mechanism for supporting and manipulating the cutter. This view also shows a vertical longitudinal section through the preferred form of holder for the tube; and the supporting parts for the holder, and Figs. 3, 4, and 5 are diagrammatic views of the cutter showing the different positions of the same in turning a ring from the tube, the latter of which is partly shown in section.

In the drawings, like characters of reference indicate corresponding parts in each figure.

In manufacturing rings by means of my preferred form of invention, substantially only three operations are necessary; firstly, the operation of bringing the cutter into action so as to form a segment of a ring. Secondly, the turning of the cutter around a constant center to enlarge the segment of the ring, and partially sever it from the stock, and thirdly, completing the severing of the ring from the stock by moving the said cutter in the desired direction around the said constant center. In machines now on the market for manufacturing rings of this class, several more operations are necessary than are employed in my machine, and therefore it is very evident that I can greatly increase the output of rings for any given time, and thus reduce cost of manufacture.

My preferred form of invention consists of a machine-bed A on which operates the longitudinal slide B which is operated by the usual screw-spindle C mounted in the said bed.

D is any suitable drive-pulley mounted in the standard E which is supported by the bed A. The spindle F (which is secured to, or formed a part of the shaft of the pulley D) may be of any suitable construction so that the tube of stock G may be carried thereby and rotated. According to the construction shown for attaching the stock to the spindle I provide the outer end $a$ of the spindle with a right hand thread, and screw thereover one end of the stock G.

H is a standard carried by the longitudinal slide B, and same is provided with a central opening I. Carried by the standard H, is a rotary bearing-ring J, of any suitable construction, which is rotated by the stock-holder 2 mounted therein. The outer surface of the stock-holder 2 is preferably tapered, as shown at 3, to conform to the tapered formation of the central opening 4 of the bearing-ring J.

5 is a ring-nut provided with a flange 6 which partially overhangs the vertical face $b$ of the stock-holder 2. The flange 7 of this ring-nut is internally threaded, and screws over the externally threaded shoulder 8 of the bearing-ring J, thus holding the stock-holder within the said bearing-ring and in such a manner that the said stock-holder rotates the said bearing-ring.

By means of the construction just described, it will be understood that the tightness of fit between the stock-holder 2 and bearing-ring J can be adjusted.

As this machine is especially designed for the manufacture of rings from tubes made of celluloid, it will be understood by one skilled in this art that it is essential to prevent friction between the stock-holder 2 and the tube of stock.

Although I do not necessarily confine myself to making the stock-holder out of wood, still I find it possesses the advantage of being cheap and in every way suitable. Sometimes the wood shrinks, and in order to keep the stock-holder tightly jammed against the bearing-ring J, I provide the construction before set forth, because the ring-nut 5 can be screwed up to jam the said stock-holder tightly within the said bearing-ring.

Upon referring to Fig. 2 it will be seen that the stock-holder 2 and the inner ends of its gripping fingers 14 are cut away so that for the cut-away area they will not come in contact with the tube of stock and so reduce very largely the possible friction-generating surfaces between the said stock-holder and the said tube.

9 is a ring-nut, the horizontal flange 10 of which is internally threaded and screws over the externally threaded portion of the standard H. The vertical flange 11 of the ring-nut 9 fits over portion of the bearing-ring J, thus retaining said bearing-ring in position within the standard H. By means of the screw 12, or any other suitable means, the ring-nut 9 is firmly secured to the standard H. Although ball bearings 13 are shown so as to reduce the friction between the bearing-ring J and the standard H and ring-nut 9, it will be understood that any suitable anti-friction means may be used for this purpose without departing from the spirit of my invention. It will be also understood that I may use any suitable construction for supporting the stock-holder by the standard H.

As this machine is primarily designed to turn rings from a tube of celluloid, I have had to design special means to prevent friction between the celluloid tube and the stock-holder so as to positively eliminate any danger of fire.

It will of course be understood that where my invention is used for turning rings out of tubular stock in connection with the manipulation of which there is no danger of fire, it will not be necessary to be particular as regards the elimination of friction between the tubular stock and its holder. For the purpose before set forth, the stock-holder 2 is integrally provided with a series of resilient gripping fingers 14, which firmly grip the stock G. I preferably, though not essentially, construct the stock-holder 2 out of wood, as I find this material gives me a good purchase on the stock.

The rotation of the spindle F rotates the stock G, and its holder 2.

15 is any suitable cross-slide which is operated by the usual lever 16, crosswise of the longitudinal slide B, and as this cross-slide may be of any suitable construction, a further description of the same is unnecessary. Pivoted to the cross-slide 15 by the stud 16—1 (the lower end of which screws into the said cross-slide), is the cutter-holder 17, which is provided with any suitable handle 18.

19 is the cutter held by any suitable means, such as the set-screws 20, on the extension 21 of said cutter-holder. Upon referring to the drawings, it will be seen that the cutter 19 is supported so that the apex 22 of its cutting-end will be on a line with the center of the thickness of the wall of the tube G, as shown by the line 23 in Fig. 3; and that the axis of rotation of the stock will lie substantially in the plane of the cutter, (Fig. 2).

In Figs. 1, 2, and 3 the position of the cutter 19 in respect of the tube G is shown before the cutter-holder 17 is advanced. By suitable means (the preferred form of which I will hereinafter particularly describe), the cutter 19 is advanced into the position shown in Fig. 4 thus shaping the end of the stock G as shown. By means of the handle 18, the cutter holder 17 is swung around the stud 16—1, and so severs the ring from the stock G as will be clearly understood on reference to Fig. 5. The cutter holder 17 is then withdrawn sufficiently to permit of the removal of the finished ring. The cutter-holder 17 is then swung back to normal position, in which position it will be retained by means of the nose 25 of the spring 24 (which spring is suitably secured to the cross-slide 15) engaging with the notch 26 formed in the base of said cutter-holder. By turning the hand-wheel 27 secured to one end of the screw-spindle C, the said screw-spindle is turned, thus feeding forward the longitudinal slide B, and, as a consequence advancing the cutter-holder 17 and the standard H, so as to feed the gripping fingers 14 over the stock.

In order to quickly adjust or position the cutter 19 in respect of the stock G in making the first cut, I use the following preferred means: 28 is a disk secured near the outer end of the screw-spindle C, and provided with a V-shaped periphery 29. Loosely mounted on the screw-spindle C between the disk 28 and the hand-wheel 27, is an arm 30, down through the head 31 of which screws the rod 32, the lower end 33 of which is designed to co-act with the V-shaped periphery 29 of the disk 28 so as to turn the screw-spindle C. 34 is a bracket carried by the bed A, and same is provided with the stops 35 and 36 adjustable thereon. Ordinarily, the rod 32 has loose contact with the disk 28. In order to advance the cutter 19 the desired distance, the said rod is thrown away from the operator until its stop 37 strikes the stop 36. The rod 32 is then screwed tightly against the disk 38 and moved toward the operator until its stop 37 strikes the stop 35; this movement turns the screw-spindle C sufficiently to advance the longitudinal slide so that the cutter 19 will be positioned as before described for the first operation.

Of course my machine is designed to receive stock, the wall of which varies in thickness, and so enable me to manufacture rings of different thicknesses. In order to manufacture a ring having a thickness greater than that manufactured from the stock shown, I must remove the cutter 19 and put in its place the proper sized cutter. In the species of my invention shown, it is very necessary that I obtain quick and accurate positioning or adjustment of the cutter, and in order to do this I have designed the following means: Secured to or formed a part of the cutter-holder 17 is an arm 38 provided with a hole 39, the center of which is directly on a line with the center of the hole 40 formed in the stud 16—1. Before placing the cutter in the cutter-holder 17, an adjusting pin (see dotted lines Fig. 2) is supported in the arm 38 and stud 16—1 by means of the holes therein. The diameter of this adjusting pin at the point where the cutting end of the cutter will about thereagainst will be such that the cutting end of the said cutter will accurately fit thereagainst, thus enabling the cutter to be held in an adjusted position while the screws 20 fasten it in place. The adjusting pin is then removed, and the machine operated as before described.

When I have increased or decreased the size of the cutting end of the cutter, it will be understood that I must adjust the position of the stops 35 and 36 so as to obtain the desired movement of the cutter, and for this purpose I have shown a plurality of holes c formed in the bracket 34 which permit the shifting of the stops 35 and 36.

By changing the stock-holder 2, it will be understood that tubes of stock having various diameters may be held by the standard H.

From the foregoing specification it will be clearly understood that in my preferred form of invention the cutter must be placed, before it can manufacture a ring from a length of tube, so that a line longitudinally bisecting the same will pass through the apex of its cutting end and be on a line with the center of the wall of the tubular stock, and that the axis of rotation of the stock will lie substantially in the plane of the cutter, (Fig. 2). If the cutter be raised above the position shown in Figs. 1 and 2, it will have to be adjusted, as before set forth, as will be readily understood by one skilled in this art.

While I have described what I consider to be the best embodiment of my invention, I desire to be understood that the principles can be embodied in different forms, and I desire not to be limited beyond the requirements of the prior art and the terms of my claims.

What I claim as my invention is:

1. In a machine of the class described, the combination of a rotary stock-holder; a cutter provided with a recessed cutting end essentially operating beyond the end of said rotary stock-holder; a cutter-holder; a movable support; means by which said cutter-holder is pivoted to said movable support; the said cutter being held by the said cutter-holder so that a line passing longitudinally through the cutter and bisecting its recessed cutting end will be on a line with the center of the thickness of the tube of stock to be turned, and at one side of the axis of rotation of the same, and that the axis of rotation of the stock will substantially lie in the same plane as the cutter and its recessed cutting end being supported so that the center thereof will be directly above the center of the pivotal means for said cutter holder, and means whereby said movable support is advanced in a straight line.

2. In a machine of the class described, the combination of a member movable longitudinally; a rotary work-holder carried by said member; a member movable transversely of said first-mentioned member; a cutter provided with a concaved cutting end essentially operating beyond the end of said rotary stock-holder; a cutter-holder; a movable support; means by which said cutter-holder is pivoted to said movable support; the said cutter being held by the said cutter-holder so that a line passing longitudinally through the cutter and bisecting its recessed cutting end will be on a line with the center of the thickness of the tube of stock to be turned, and at one side of the axis of rotation of the same, and that the axis of rotation of the stock will substantially lie in the same plane as the cutter, the concaved cutting end of said cutter being supported so that the center thereof will be directly above the center of the pivotal means for said cutter-holder, and means whereby said movable support is advanced in a straight line.

3. In a machine of the class described, the combination of a rotary stock-holder; a cutter provided with a recessed cutting end essentially operating beyond the end of said rotary stock-holder, and positioned so that a line passing longitudinally through the recessed cutting end of said cutter will be on a line with the center of the thickness of the tube to be turned, and at one side of the axis of rotation thereof means for giving one of said elements movement in a straight line parallel to the longitudinal axis of said rotary stock-holder so that the said cutter will, during this movement, partially manufacture a ring from the end of the tubular stock projecting beyond said rotary stock-holder, and means whereby one of the two first-mentioned elements is moved around a constant pivotal point so that the said cutter may complete the manufacture of the partially-formed ring and sever it from said stock.

4. In a machine of the class described, the combination of a rotary stock-holder; a cutter provided with the recessed cutting end operating beyond the end of said rotary stock-holder; a pivoted support holding said cutter so that a line passing longitudinally through the recessed cutting end of said cutter will be on a line with the center of the thickness of the tube to be turned, and at one side of the axis of rotation thereof and the pivotal axis of said support will pass through the center of the recess in the cutting end of said cutter, and means whereby said support is advanced so as to carry the cutter in a straight line.

5. In a machine of the class described, the combination with a cutter-holder; a supporting member; a stud for pivoting said cutter-holder to said member and provided with a pocket in its upper end; an arm carried by said cutter-holder and provided with a hole the center of which is on a line with the center of the pocket in the said stud, and a cutter-seat the central line of which intersects the axis' center line of said stud.

In testimony whereof I have signed my name to this specification, in the presence of two subscribing witnesses.

WILLIAM DONALD MITCHELL.

Witnesses:
WM. S. JORDAN,
N. LANGFIELD.